United States Patent
Kwon et al.

(10) Patent No.: US 9,918,291 B2
(45) Date of Patent: Mar. 13, 2018

(54) SYSTEMS AND METHODS FOR EFFICIENT CHANNEL SYNCHRONIZATION

(71) Applicant: Futurewei Technologies, Inc., Plano, TX (US)

(72) Inventors: Young Hoon Kwon, San Diego, CA (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/144,938

(22) Filed: May 3, 2016

(65) Prior Publication Data

US 2016/0249309 A1    Aug. 25, 2016

Related U.S. Application Data

(63) Continuation of application No. 14/042,176, filed on Sep. 30, 2013, now Pat. No. 9,344,980.
(Continued)

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0053* (2013.01); *H04L 5/0085* (2013.01);
(Continued)

(58) Field of Classification Search
CPC ......... H04W 52/0216; H04W 56/0015; H04W 84/12; Y02B 60/50
See application file for complete search history.

(56) References Cited

U.S. PATENT DOCUMENTS 7,751,396 B2   7/2010  Kakani
8,913,560 B2   12/2014 Fischer
(Continued)

FOREIGN PATENT DOCUMENTS

CN    101388717 A   3/2009
CN    101540709 A   9/2009
(Continued)

OTHER PUBLICATIONS

Park, M. "Specification Framework for TGah," IEEE P802.11 Wireless LANs, IEEE P802.11-1137r14, Mar. 2013. 68 pages.
(Continued)

*Primary Examiner* — Chandrahas B Patel
(74) *Attorney, Agent, or Firm* — Futurewei Technologies, Inc.

(57) ABSTRACT

System and method embodiments are provided for efficient channel synchronization. The embodiments enable a reduction in a stations power consumption and reduce network overhead for transmitting synchronization frames by refraining from sending the synchronization frame when it is not needed. In an embodiment, a method in an access point (AP) for synchronizing a station (STA) associated with the AP includes sending, by the AP, a first management frame that indicates a time slot that is allocated for the STA and sending a synchronization frame at a boundary of the time slot allocated for the STA if the AP determines that a channel is idle at the boundary of the time slot allocated for the STA and if the time slot that is allocated for the STA is longer than a first threshold value.

16 Claims, 7 Drawing Sheets

Related U.S. Application Data

(60) Provisional application No. 61/816,620, filed on Apr. 26, 2013.

(51) Int. Cl.
*H04L 27/26* (2006.01)
*H04W 28/02* (2009.01)
*H04W 52/02* (2009.01)
*H04W 72/04* (2009.01)

(52) U.S. Cl.
CPC ...... *H04L 27/2655* (2013.01); *H04L 27/2692* (2013.01); *H04W 28/0289* (2013.01); *H04W 52/02* (2013.01); *H04W 72/0446* (2013.01); *Y02B 60/50* (2013.01)

(56) References Cited

U.S. PATENT DOCUMENTS

| | | | |
|---|---|---|---|
| 9,019,874 | B2 | 4/2015 | Choudhury et al. |
| 9,451,636 | B2 * | 9/2016 | Seok ............... H04W 74/04 |
| 2006/0285507 | A1 | 12/2006 | Kinder et al. |
| 2012/0188998 | A1 | 7/2012 | Philips et al. |
| 2012/0275449 | A1 | 11/2012 | Sakoda |
| 2013/0279382 | A1 | 10/2013 | Park et al. |
| 2015/0124800 | A1 | 5/2015 | Sakoda et al. |

FOREIGN PATENT DOCUMENTS

| | | |
|---|---|---|
| CN | 102625440 A | 8/2012 |
| KR | 20090100273 A | 9/2009 |
| RU | 2411649 C2 | 2/2011 |
| WO | 2013/048499 A1 | 4/2013 |
| WO | 2013162998 A1 | 10/2013 |
| WO | 2014/023873 A1 | 2/2014 |

OTHER PUBLICATIONS

Park, M. et al., "AP Assisted Medium Synchronization," IEEE 802.11-12/0840r1, Sep. 17, 2012. 16 pages.

Cheong, M., "TGah Functional Requirements and Evaluation Methodology Rev. 5," IEEE 802.11-09/000000905r5, Jan. 2012. 24 pages.

Park, M., "Proposed Specification Framework for TGah," IEEE 802.11-11/1137r12, Nov. 2012. 51 pages.

Park, M., "Proposed Specification Framework for TGah," IEEE 802.11-11/1137r12, Jan. 2013. 58 pages.

Wong, E. et al., "Two-Hop Relay Function," IEEE802.11-12/1330r0, Nov. 2012. 27 pages.

Minyoung Park, "Proposed Specification Framework for TGah," IEEE 802.11-11/1137r13, Jan. 2013, 58 pages.

* cited by examiner

US 9,918,291 B2

SYSTEMS AND METHODS FOR EFFICIENT CHANNEL SYNCHRONIZATION

CROSS-REFERENCE TO RELATED APPLICATIONS

The present application is a continuation of U.S. patent application Ser. No. 14/042,176 filed on Sep. 30, 2013, now allowed, and titled "Systems and Methods for Efficient Channel Synchronization," which claims the benefit of U.S. Provisional Patent Application No. 61/816,620 filed on Apr. 26, 2013 and entitled "System and Method for Efficient Channel Synchronization," both of which are incorporated herein by reference as if reproduced in their entirety.

TECHNICAL FIELD

The present invention relates to a system and method for wireless communications, and, in particular embodiments, to a system and method for efficient channel synchronization.

BACKGROUND

Institute of Electrical and Electronics Engineers (IEEE) 802.11 TGah defines the concept of synch frame for saving power consumption of stations. When requested by a station (STA), an access point (AP) sends a synchronization (synch) frame at the slot boundary or the target wake time of the STA, if the channel is idle, to help the STA quickly synch to the medium. This is optional to the AP and STA. It is recommended that the AP sends a null data packet (NDP) clear-to-send (CTS) frame as a synch frame. The use of a synch frame is very useful because STAs do not need to wait and listen to the wireless medium for ProbeDelay time, which consumes quite a lot of power.

FIG. 1 illustrates a short synch frame example 100. The AP transmits a beacon frame 102 that the STA receives in the awake state. If the AP determines that the channel is idle at the slot boundary 104, the AP transmits a short synch frame 106 at the slot boundary 104 to help a station to quickly synch to the medium. The STA wakes up at the slot boundary 104 and waits for channel synch. If the STA receives the short synch frame 106 from the AP at the slot boundary 104, the STA starts to access the channel right after the reception of the short synch frame 106 and transmits data 108. The channel access follows the enhanced multimedia distributed control access (EDCA) rules. The STA does not need to sense the channel for a long ProbeDelay time to synch to the medium. The AP may transmit an acknowledgement (ACK) frame 110 to the STA after receiving the data 108.

SUMMARY

In accordance with an embodiment, a method in an access point (AP) for synchronizing a station (STA) associated with the AP includes sending, by the AP, a first management frame that indicates a time slot that is allocated for the STA; sending a synchronization frame at a boundary of the time slot allocated for the station if the AP determines that a first condition and a second condition are met, wherein the first condition comprises a determination that a channel is idle at the boundary of the time slot allocated for the station and the second condition comprises determining that transmission of the synchronization frame reduces a waiting time of the station before its frame transmission; and refraining from sending the synchronization frame at the boundary of the time slot allocated for the station if the AP determines that the first condition is not met, or that the second condition is not met, or that both the first and second conditions are not met.

In accordance with an embodiment, an access point (AP) configured for synchronizing a station (STA) includes a processor and a computer readable storage medium storing programming for execution by the processor, the programming including instructions to: send a first management frame that indicates a time slot that is allocated for the STA; send a synchronization frame at a boundary of the time slot allocated for the station if the AP determines that a first condition and a second condition are met, wherein the first condition comprises a determination that a channel is idle at the boundary of the time slot allocated for the station and the second condition comprises determining that transmission of the synchronization frame reduces a waiting time of the station before its frame transmission; and refrain from sending the synchronization frame at the boundary of the time slot allocated for the station if the AP determines that the first condition is not met, that the second condition is not met, or that both the first and second conditions are not met.

In accordance with an embodiment, a method in an access point (AP) for synchronizing a station (STA) associated with the AP includes sending, by the AP, a first management frame that indicates a time slot that is allocated for the STA and sending a synchronization frame at a boundary of the time slot allocated for the STA if the AP determines that a channel is idle at the boundary of the time slot allocated for the STA and if the time slot that is allocated for the STA is longer than a first threshold value.

In accordance with an embodiment, an access point (AP) configured for synchronizing a station (STA) includes a processor and a computer readable storage medium storing programming for execution by the processor, the programming including instructions to: send a first management frame that indicates a time slot that is allocated for the STA; and send a synchronization frame at a boundary of the time slot allocated for the STA if the AP determines that a channel is idle at the boundary of the time slot allocated for the STA and if the time slot that is allocated for the STA is longer than a first threshold value.

In accordance with an embodiment, a method in an access point (AP) for synchronizing a station (STA) includes receiving at the AP a request from a STA for synchronization (synch) and transmitting a synch frame to the STA at a slot boundary or at the target wake time of the STA if a transmission channel is idle, wherein the AP refrains from transmitting the synch frame at each slot boundary within a restricted access window (RAW) period if a cross-slot boundary transmission is not allowed within the RAW period.

In accordance with an embodiment, an access point (AP) configured for synchronizing a station (STA) includes a processor and a computer readable storage medium storing programming for execution by the processor, the programming including instructions to: receive a request from a STA for synchronization (synch); and transmit a synch frame to the STA at a slot boundary or at the target wake time of the STA if a transmission channel is idle, wherein the AP refrains from transmitting the synch frame at each slot boundary within a restricted access window (RAW) period if a cross-slot boundary transmission is not allowed within the RAW period unless a network allocation vector (NAV) protection is requested by the STA.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
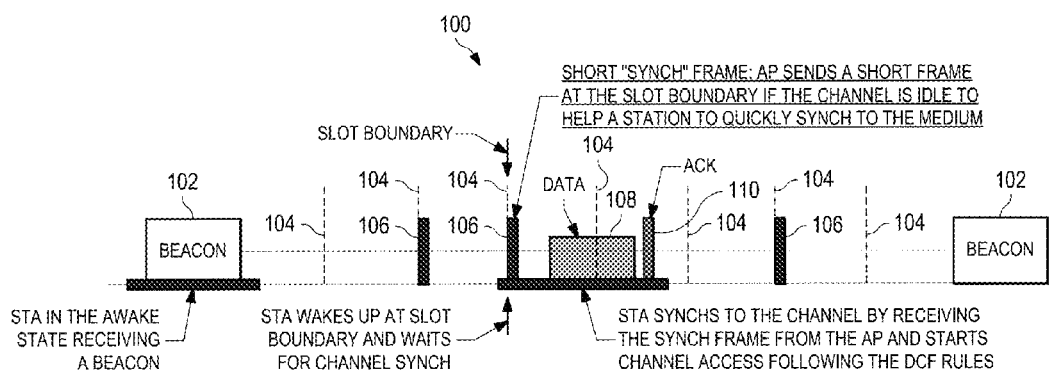
FIG. 1 illustrates a short synch frame example.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

As discussed above, IEEE 802.11 TGah defines a synchronization frame to reduce power consumption for channel sensing. The term synchronization frame may also be referred to as a synch frame and the two terms are used interchangeably throughout this disclosure. In an embodiment, the synch frame is a control frame. However, if both the AP and STA agree to use the synch frame, they always have to use the synch frame even though in some situation it does not provide any benefit. The use of the synch frame increases overall network load as APs that need to continuously transmit synch frames. Especially for the use of synch frames under restricted access window (RAW) operation, the overhead can be significant.

In RAW operation, a RAW is divided into time slots. The STA wakes up at target beacon transmission time (TBTT) and listens to a beacon frame that indicates the slot duration for each RAW. The slot duration for each RAW may be different. The STA determines its channel access slot assigned by the AP. The STA may sleep before its channel access slot. The STA starts to access the channel at the slot boundary of its channel access slot based on EDCA. The AP indicates whether the following transmission opportunity (TXOP) rule is applied in each RAW: a TXOP or transmission within a TXOP shall not extend across a slot boundary. If the above TXOP rule is applied, the STA does not wait for ProbeDelay when waking up at the slot boundary. In an embodiment, the ProbeDelay is defined according to IEEE 802.11.

Disclosed are systems and methods for efficiently channel synchronizing one or more wireless stations with an AP. In an embodiment, the AP only sends a synch frame when a synch frame is helpful. The AP does not send a synch frame if a STA does not need to wait for a Probe Delay when the STA wakes up. The AP does not send a synch frame if the overhead of the synch frame exceeds a threshold. For example, if a cross-slot boundary transmission is not allowed, a STA does not wait for a ProbeDelay when waking up at the slot boundary. Therefore, a synch frame is not needed.

In an embodiment, an AP sends a synch frame transmission at a given slot boundary if two conditions are met. The first condition is that the AP determines that the channel is idle. The second condition is that the AP determines that cross-slot boundary transmission is allowed.

In an embodiment, a RAW parameter is defined in a beacon frame. The RAW parameter in the Beacon frame indicates whether cross-slot boundary transmission is allowed or not allowed within the RAW for a STA. If cross-slot boundary transmission is allowed within the RAW, then, at the slot boundary, the AP sends a synch frame and each STA accesses the channel after listening to the synch frame. If cross-slot boundary transmission is not allowed within the RAW, then the AP does not send a synch frame at the slot boundary and each STA accesses the channel without waiting for a Probe Delay.

In an embodiment, if RAW is allocated for polling/trigger frame transmission, the slot duration for each STA is very short. In this situation, use of additional synch frames provides too much overhead for the short frame transmission. Therefore, in an embodiment, the AP does not send a synch frame in this situation unless certain conditions are met. In an embodiment, if synch frame operation is done under RAW operation, an AP sends a synch frame transmission at the given slot boundary if the AP determines that the channel is idle and the slot duration for the STA is longer than a predetermined threshold value. The threshold value is obtained when the STA associates to the AP's network. In another embodiment, if synch frame operation is done under RAW operation, an AP sends the synch frame at the given slot boundary if the AP determines that the channel is idle and the slot duration for the STA is longer than a predetermined threshold value where the threshold value is obtained by calculating a required time for packet delivery including, for example, synch, polling/trigger, ACK frame transmission, and related backoff time.

In an embodiment, a RAW parameter is defined in a beacon frame. The slot duration within the RAW defined in the beacon frame is longer than a given slot duration threshold. Thus, at the slot boundary, the AP sends a synch frame and each STA accesses the channel after listening to the synch frame. If the slot duration within the RAW defined in the beacon frame is shorter than a given slot duration threshold, at the slot boundary, the AP refrains from sending a synch frame and each STA accesses the channel without waiting for the synch frame.

In an embodiment, an AP sends a synch frame only when the synch frame is helpful. For example, the AP does not send a synch frame if a STA does not need to wait for a Probe Delay when it wakes up. As another example, the AP does not send a synch frame if the overhead of the synch frame is over a threshold. A synch frame is transmitted only when it meets a strict condition, in which case the transmission of the synch frame provides a performance gain.

An embodiment can reduce the synchronization time for STAs, which can result in a reduction of a STA's power consumption. An embodiment can reduce the network overhead of transmitting a synch frame by not sending the synch frame when it is not needed. Embodiments may be implemented in wireless networks and devices, such as smartphones, tablets, dongles, wireless sensors, machine-to-machine (M2M) devices, and the like.

An embodiment method for an access point to receive a frame from a station scheduled by the access point includes sending a first management frame that indicates a time slot that is allocated for a station. The method includes sending a synch frame at a boundary of the time slot allocated for the station if the access point senses that a channel is idle at the boundary of the time slot allocated for the station; and a first condition that transmission of the synch frame reduces a waiting time of the station before its frame transmission is met. The method also includes refraining from sending a synch frame at a boundary of the time slot allocated for the station if the access point senses that the channel is busy at the boundary of the time slot allocated for the station, or the first condition that transmission of the synch frame reduces a waiting time of the station before its frame transmission is not met. The method further includes receiving the uplink frame sent by the station, and sending an acknowledgement frame to the station.

An embodiment method for an access point to receive a frame from a station scheduled by the access point includes sending a first management frame that indicates a time slot that is allocated for the station. The method includes sending a synch frame at a boundary of the time slot allocated for the station if the access point senses that a channel is idle at the boundary of the time slot allocated for the station, and the time slot that is allocated for the station is longer than a first threshold value. The method also includes receiving the frame sent by the station, and sending an acknowledgement frame to the station.

With respect to a first embodiment, if cross-slot boundary transmission is not allowed, a STA does not wait for Probe-Delay when waking up at the slot boundary. Therefore, the main purpose of using a synch frame is not needed. In the first embodiment, if synch frame operation is done under RAW operation, an AP sends a synch frame transmission at the given slot boundary if the AP senses channel is idle, and cross-slot boundary transmission is allowed.

The Cross Slot Boundary sub-subfield in the RAW parameter set element in a beacon frame is a binary bit and indicates whether ongoing transmission from a STA is allowed to cross its assigned slot boundary. If the bit is set to 1, crossing a slot boundary is allowed. If the bit is set to 0, crossing a slot boundary is not allowed for transmissions from STAs. These bit values may be reversed.

In various embodiments, the beacon frame is a management frame. In various embodiments, the synch frame is a control frame. In various embodiments, the beacon frame and the synch frame are the same frame.

Figure 2:
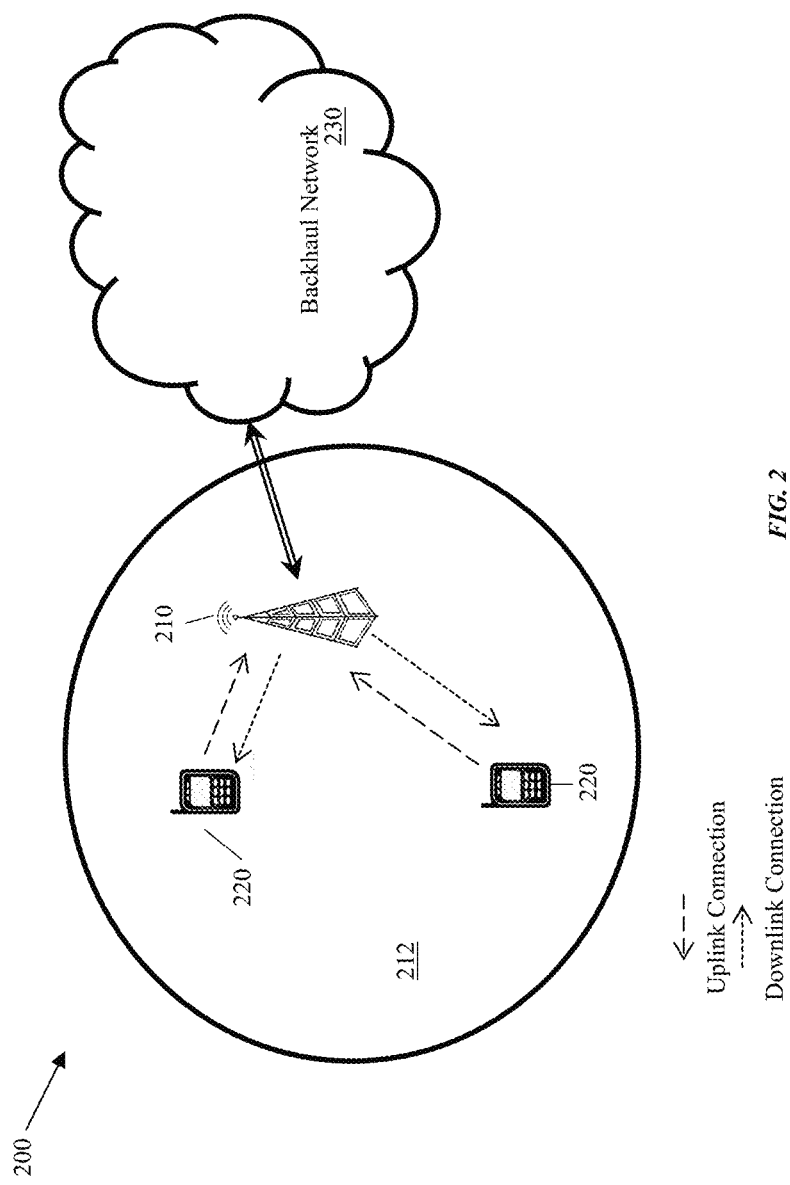
FIG. 2 illustrates a network for communicating data.

FIG. 2 illustrates a network 200 for communicating data. The network 200 comprises an AP 210 having a coverage area 212, a plurality of STAs 220, and a backhaul network 230. As used herein, the term AP may also be referred to as a transmission point (TP) or a base station (BS) and the three terms may be used interchangeably throughout this disclosure. The AP 210 may comprise any component capable of providing wireless access by, inter alia, establishing uplink (UL) (dashed line) and/or downlink (DL) (dotted line) connections with the STAs 220, such as a base transceiver station (BTS), an enhanced base station (eNB), a femtocell, and other wirelessly enabled devices. The STAs 220 may comprise any component capable of establishing a wireless connection with the AP 210. The STAs 220 may also be referred to as user equipment (UEs). Examples of STAs include smart phones, tablet computers, and laptops. The backhaul network 230 may be any component or collection of components that allow data to be exchanged between the AP 210 and a remote end (not shown). In some embodiments, the network 200 may comprise various other wireless devices, such as relays, femtocells, etc.

The AP 210 is configured to send a synch frame to the STAs 220 at corresponding slot boundaries when the STAs 220 wake up when certain conditions are met and to refrain from sending the synch frame when these conditions are not met. In an embodiment, the conditions for sending a synch frame include determining that the channel is idle and that cross-slot boundary transmission is allowed. In an embodiment, if either condition is not met, then the AP 210 refrains from sending a synch frame to a corresponding STA 220.

Figure 3A:
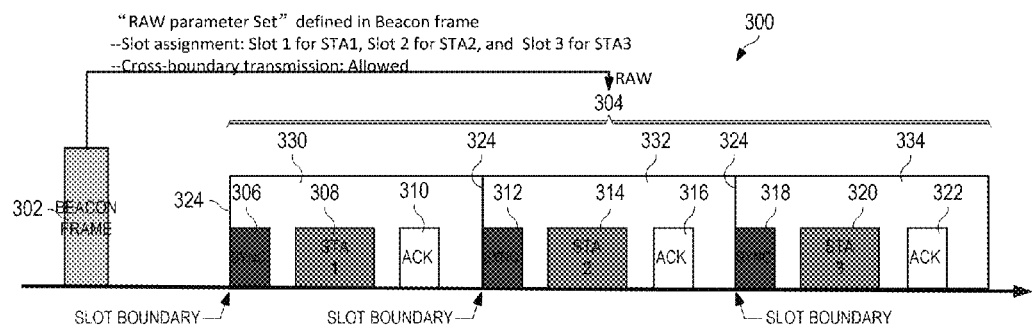
FIGS. 3A and 3B illustrate an operation example for a first embodiment of channel synchronization.
Figure 3B:
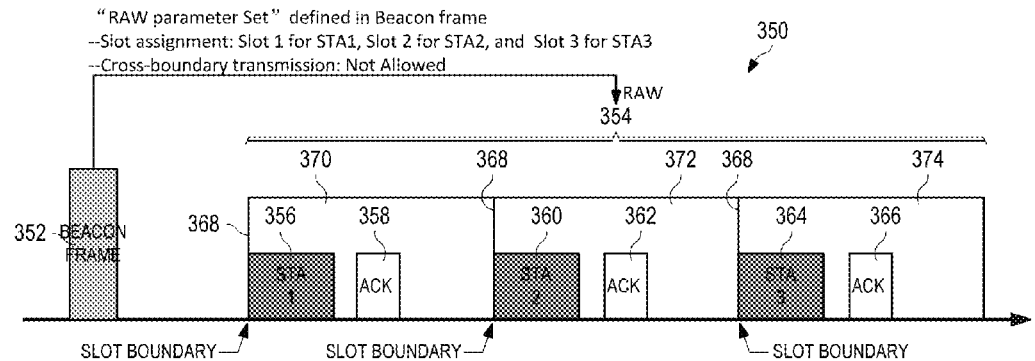

FIGS. 3A and 3B illustrate an operation example. For the case 300 of FIG. 3A, a RAW parameter is defined in the beacon frame 302. Cross-slot boundary transmission (e.g., transmission of frames across the slot boundary 324) is allowed within the RAW 304. At the slot boundary 324 (i.e., the time slot boundary), the AP sends a synch frame transmission (synch frame) 306, 312, 318, and each STA (i.e., STA1, STA2, and STA3) accesses the channel after listening to the respective synch frame 306, 312, 318. STA1 transmits data 308 during slot 1 330, STA2 transmits data 314 during slot 2 332, and STA3 transmits data 320 during slot 3 334. After receiving the data 308, 312, 320 from the various STAs, the AP transmits a respective reply frame or ACK frame 310, 316, 322 for each STA. In an embodiment, the beacon frame 302 is defined according to IEEE 802.11.

For the case 350 of FIG. 3B, a RAW parameter is defined in the beacon frame 352. Cross-slot boundary transmission is not allowed within the RAW 354. At the slot boundary 368, the AP does not send a synch frame, and each STA accesses the channel and sends respective data 356, 360, 364 during a respective slot 370, 372, 374 without waiting for a Probe Delay. After receiving the data 356, 360, 364 from the various STAs, the AP transmits a respective ACK frame 358, 362, 366 to the respective STAs during their respective slots 370, 372, 374. The slot assignments are slot 1 370 for STA1, slot 2 372 for STA2, and slot 3 374 for STA3.

In an embodiment, if RAW is allocated for polling/trigger frame transmission, the slot duration for each STA will be very short: two NDP frames (NDP power save (PS)-Poll+ NDP acknowledge (ACK)), one short interframe space (SIFS), one distributed coordination function (DCF) interframe space (DIFS), and random backoff. In this situation, the use of an additional synch frame would cause too much overhead for this short frame transmission.

In the second embodiment, if synch frame operation is done under RAW operation, an AP sends a synch frame at the given slot boundary if the AP senses the channel is idle, and slot duration for the STA is longer than a predetermined threshold value. The threshold value is obtained when the STA associates to the AP's network.

In the third embodiment, if synch frame operation is done under RAW operation, an AP sends a synch frame at the given slot boundary if the AP senses the channel is idle, and slot duration for the STA is longer than a predetermined threshold value or predetermined time duration. The threshold value is obtained by calculating required time for packet delivery including (for example, synch, polling/trigger, ACK frame transmission, and related backoff time).

Figure 4A:
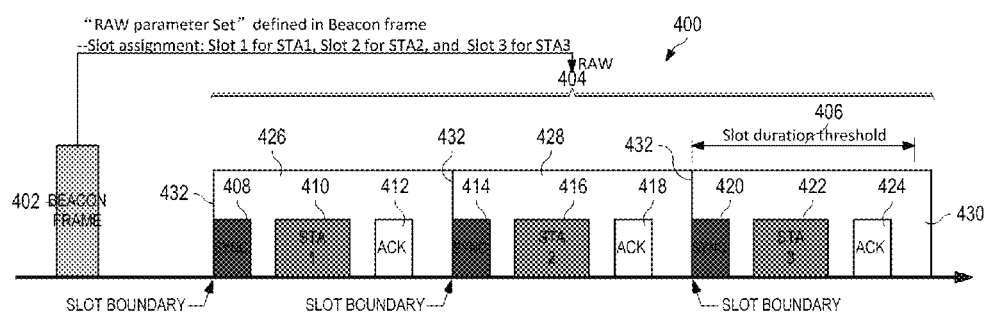
FIGS. 4A and 4B illustrate an operation example for second and third embodiments of channel synchronization.
Figure 4B:
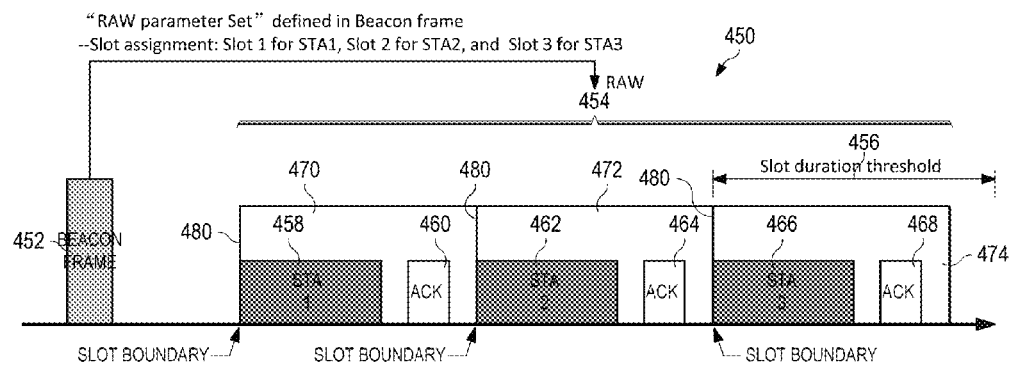

FIGS. 4A and 4B illustrate an operation example for the second and third embodiments. For the case 400 of FIG. 4A, a RAW parameter is defined in the beacon frame 402. Slot duration for a slot 426, 428, 430 within the RAW 404 defined in the beacon frame 402 is longer than a given slot duration threshold 406. In an embodiment, the slot duration threshold 406 is shorter than a minimum required time for polling frame transmission or polling frame delivery. At each slot boundary 432, the AP sends a respective synch frame 408, 414, 420 for the respective STAs and each STA accesses the channel after listening to the synch frame 408, 414, 420 during a respective slot 426, 428, 430 and transmits data 410, 416, 422. In an embodiment, the data 410, 416, 422 are polling frame transmissions. After receiving the data 410, 416, 422 from the respective STAs, the AP transmits a respective ACK frame 412, 418, 424 to the respective STAs during a respective slot 426, 428, 430. The slot assignments are slot 1 426 for STA1, slot 2 428 for STA2, and slot 3 430 for STA3. In an embodiment, the acknowledgement frame transmission (i.e., ACK frame) may be an association response frame defined in IEEE 802.11.

For the case 450 of FIG. 4B, a RAW parameter is defined in the beacon frame 452. Slot duration of the respective slots 470, 472, 474 within the RAW 454 defined in the beacon frame 452 is shorter than a given slot duration threshold 456. At the slot boundary 480, the AP does not send a synch frame, and each STA accesses the channel without waiting for the synch frame during a respective slot 470, 472, 474 and transmits data 458, 462, 466. The AP responds to each data transmission 458, 462, 466 with a respective ACK frame 460, 464, 468 during a respective slot 470, 472, 474. The slot assignments are slot 1 470 for STA1, slot 2 472 for STA2, and slot 3 474 for STA3.

Figure 5:
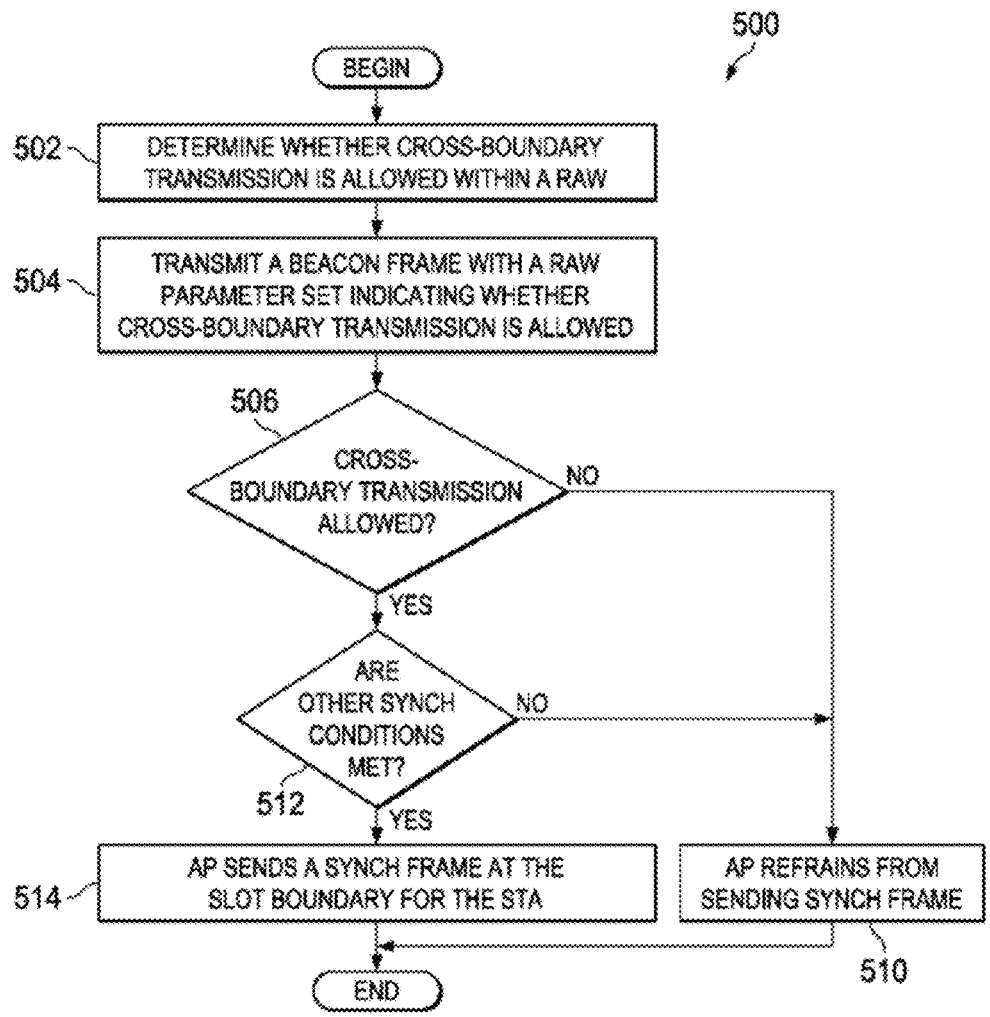
FIG. 5 is flowchart of an embodiment method for channel synchronization.

FIG. 5 is flowchart of an embodiment method 500 for channel synchronization. The method 500 begins at block 502 where the AP determines whether cross-slot boundary transmission is allowed within a RAW. At block 504, the AP transmits (e.g., broadcasts) a beacon frame to the STAs with a RAW parameter set indicating whether cross-slot boundary transmission is allowed. If, at block 506, cross boundary transmission is not allowed then the method 500 proceeds to block 510 where the AP refrains from sending a synch frame, after which, the method 500 ends. At block 506, if cross-slot boundary transmission is allowed, the method 500 proceeds to then the method 500 proceeds to block 512 where the AP determines whether other synch conditions are met. Examples of other synch conditions include whether the channel is idle and if the slot duration for the STA is longer than a predetermined threshold. If, at block 512, other synch conditions are met, then the method 500 proceeds to block 514 where the AP sends a synch frame at the slot boundary for the respective STA, after which, the method 500 ends. If, at block 512, other synch conditions are not met, then the method 500 proceeds to block 510 where the AP refrains from sending a synch frame, after which, the method 500 ends. If should be noted that in various embodiments, one or more of the steps in the method 500 may be omitted and other steps included. Furthermore, in embodiments, the order of the steps may be rearranged and various steps may be performed substantially simultaneously.

Figure 6:
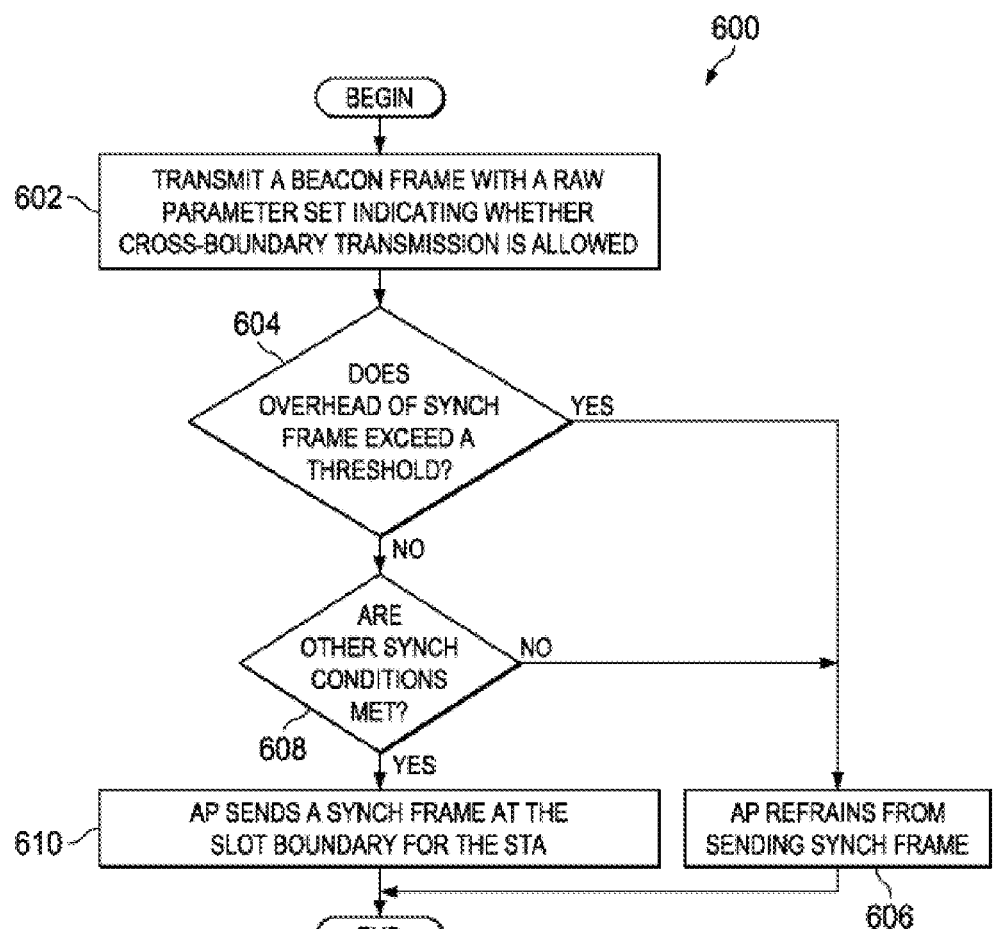
FIG. 6 is flowchart of an embodiment method for channel synchronization.

FIG. 6 is flowchart of an embodiment method 600 for channel synchronization. The method 600 begins at block 602 where the AP transmits (e.g., broadcasts) a beacon frame to the STAs after which the method 600 proceeds to block 604. If, at block 604, overhead costs of the synch frame transmission exceed a threshold, then the method 600 proceeds to block 606 where the AP refrains from sending a synch frame, after which the method 600 ends. If, at block 604, the overhead of transmitting the synch frame does not exceed a threshold, then the method 600 proceeds to block 608 where the AP determines whether other synch conditions are met. Examples of other synch conditions include whether the channel is idle and if the slot duration for the STA is longer than a predetermined threshold. If, at block 608, other synch conditions are met, then the method 600 proceeds to block 610 where the AP sends a synch frame at the slot boundary for the respective STA, after which, the method 600 ends. If, at block 608, other synch conditions are not met, then the method 600 proceeds to block 606 where the AP refrains from sending a synch frame, after which, the method 600 ends. If should be noted that in various embodiments, one or more of the steps in the method 600 may be omitted and other steps included. Furthermore, in embodiments, the order of the steps may be rearranged and various steps may be performed substantially simultaneously.

Figure 7:
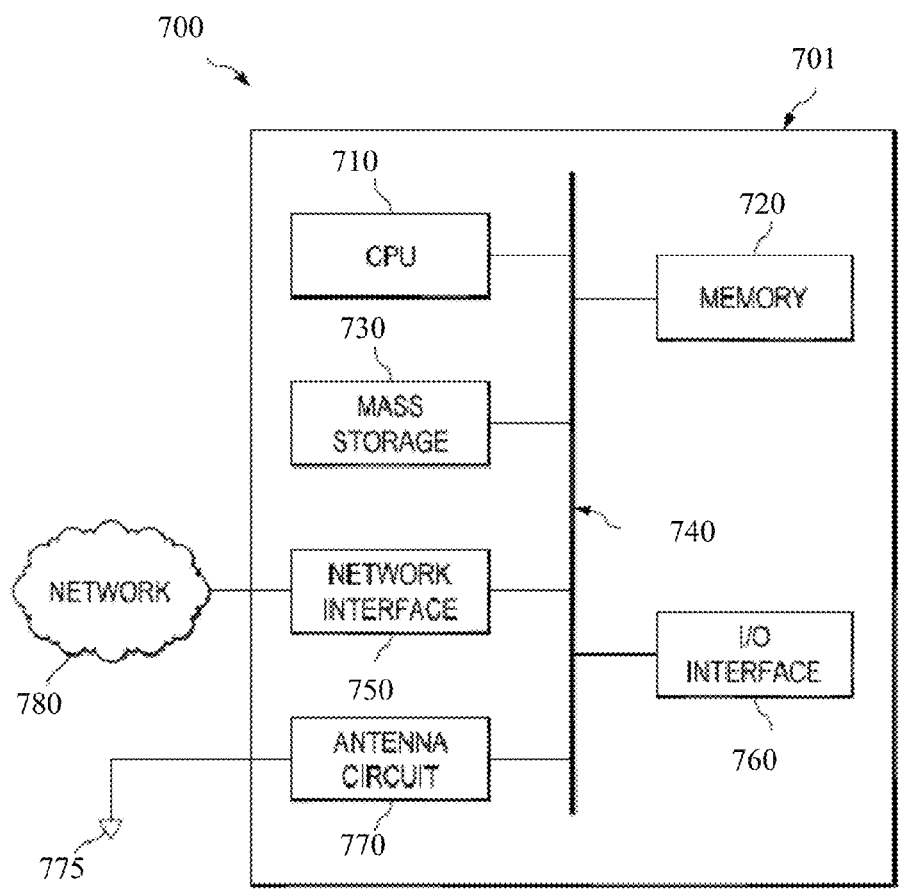
FIG. 7 illustrates a computing platform that may be used for implementing, for example, the devices and methods described herein, in accordance with an embodiment.

FIG. 7 is a block diagram of a processing system 700 that may be used for implementing the devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 700 may comprise a processing unit 701 equipped with one or more input/output devices, such as a speaker, microphone, mouse, touchscreen, keypad, keyboard, printer, display, and the like. The processing unit 701 may include a central processing unit (CPU) 710, memory 720, a mass storage device 730, a network interface 750, an I/O interface 760, and an antenna circuit 770 connected to a bus 740. The processing unit 701 also includes an antenna element 775 connected to the antenna circuit.

The bus 740 may be one or more of any type of several bus architectures including a memory bus or memory controller, a peripheral bus, video bus, or the like. The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs.

The mass storage device 730 may comprise any type of storage device configured to store data, programs, and other information and to make the data, programs, and other information accessible via the bus 740. The mass storage device 730 may comprise, for example, one or more of a solid state drive, hard disk drive, a magnetic disk drive, an optical disk drive, or the like.

The I/O interface 760 may provide interfaces to couple external input and output devices to the processing unit 701. The I/O interface 760 may include a video adapter. Examples of input and output devices may include a display coupled to the video adapter and a mouse/keyboard/printer coupled to the I/O interface. Other devices may be coupled to the processing unit 701 and additional or fewer interface cards may be utilized. For example, a serial interface such as Universal Serial Bus (USB) (not shown) may be used to provide an interface for a printer.

The antenna circuit 770 and antenna element 775 may allow the processing unit 701 to communicate with remote units via a network. In an embodiment, the antenna circuit 770 and antenna element 775 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 770 and antenna element 775 may also provide Bluetooth and/or WiFi connection to other devices.

The processing unit 701 may also include one or more network interfaces 750, which may comprise wired links, such as an Ethernet cable or the like, and/or wireless links to access nodes or different networks. The network interface 701 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

The following references are related to subject matter of the present application. Each of these references is incorporated herein by reference in its entirety:

TGah Specification Framework, IEEE 802.11-11/1137r14.

AP assisted medium synchronization, IEEE 802.11-12/0840r1.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed is:

1. A method in an access point (AP) for synchronizing a station (STA) associated with the AP, the method comprising:
   sending, by the AP, a first frame that indicates a time slot that is allocated for the station, wherein the first frame is a beacon frame;
   receiving, by the AP, a request from the station for transmission of a synchronization frame; and
   sending, by the AP, the synchronization frame at a boundary of the time slot allocated for the station wherein a channel is idle at the boundary of the time slot allocated for the station, and the beacon frame indicates that transmission of frames from other stations before the time slot allocated for the station is allowed to cross the boundary of the time slot allocated for the station.

2. The method of claim 1, further comprising:
   sending, by the AP before receiving the request, a second frame that indicates that the AP supports transmission of the synchronization frame.

3. The method of claim 2, wherein the second frame is a beacon frame.

4. The method of claim 1, wherein the synchronization frame comprises a null data packet (NDP) clear to send (CTS) frame.

5. The method of claim 1, wherein the method further comprising:
   refraining from sending, by the AP, a synchronization frame at a boundary of the time slot allocated for the station wherein a channel is not idle at the boundary of the time slot allocated for the station, or wherein transmission of frames from other stations before the time slot allocated for the station is not allowed to cross the boundary of the time slot allocated for the station.

6. The method of claim 1, wherein the time slot allocated for the station is under a restricted access window (RAW).

7. The method of claim 1, wherein the first frame further indicates that the AP supports transmission of the synchronization frame.

8. A method in an access point (AP) for synchronizing a station (STA), the method comprising:
   sending, by the AP, a beacon frame that indicates a time slot that is allocated for the station;
   receiving, by the AP, a request from the STA for synchronization (synch); and
   refraining, by the AP, from transmitting a synch frame at the time slot within a restricted access window (RAW) period wherein the beacon frame indicates that a cross-slot boundary transmission is not allowed within the RAW period.

9. The method of claim 8, wherein the synch frame comprises a null data packet (NDP) clear to send (CTS) frame.

10. An access point (AP) configured for synchronizing a station (STA), the AP comprising:
    a processor; and
    a computer readable storage medium storing programming for execution by the processor, the programming including instructions to:
    send a first frame that indicates a time slot that is allocated for the station, wherein the first frame is a beacon frame;
    receive a request from the station for transmission of a synchronization frame; and
    send the synchronization frame at a boundary of the time slot allocated for the station if a channel is idle at the boundary of the time slot allocated for the station, and if the beacon frame indicates that transmission of frames from other stations before the time slot allocated for the station is allowed to cross the boundary of the time slot allocated for the station.

11. The access point of claim 10, the programming including instructions further to:
    send a second frame that indicates that the access point supports transmission of the synchronization frame.

12. The access point of claim 11, wherein the second frame is a beacon frame.

13. The access point of claim 10, wherein the synchronization frame comprises a null data packet (NDP) clear to send (CTS) frame.

14. The access point of claim 10, wherein the first frame further indicates that the AP supports transmission of the synchronization frame.

15. The access point of claim 10, the programming including instructions further to:
    refrain from sending a synchronization frame at a boundary of the time slot allocated for the station if a channel is not idle at the boundary of the time slot allocated for the station, or if transmission of frames from other stations before the time slot allocated for the station is not allowed to cross the boundary of the time slot allocated for the station.

16. The access point of claim 10, wherein the time slot allocated for the station is under a restricted access window (RAW).

* * * * *